Patented May 3, 1938

2,116,206

UNITED STATES PATENT OFFICE 2,116,206

POLYAZO DYESTUFFS

Hans Krzikalla and Bernd Eistert, Ludwigshafen-on-the-Rhine, Germany, assignors to General Aniline Works, Inc., New York, N. Y., a corporation of Delaware No Drawing. Application October 23, 1936, Serial No. 107,149. In Germany November 8, 1935

9 Claims. (Cl. 260—70)

The present invention relates to polyazo dyestuffs.

We have found that new and valuable polyazo dyestuffs are obtained by first coupling tetrazotized 2,6-diamino-1-chlor-benzene - 4 - sulphonic acid in acid solution with one molecular proportion of a benzene derivative capable of coupling at least twice and then coupling in alkaline solution with a second molecular proportion of the same or another coupling component; the disazo dyestuffs thus obtained may be converted into trisazo or tetrakisazo dyestuffs by the action of 1 or 2 molecular proportions of a diazo compound or of 2 molecular proportions of different diazo compounds.

As benzene derivatives which are capable of coupling at least twice may be mentioned for example 1,3-dihydroxybenzene, 1-methyl-2,4-dihydroxybenzene, 1,3,5-trihydroxybenzene, 1,3-diaminobenzene, 1-methyl-2,4-diaminobenzene, 1-nitro-2,4 - diaminobenzene, 1,3 - diaminobenzene-4-sulphonic acid, 1,3-diaminobenzene-5-sulphonic acid and 1-amino-3-hydroxybenzene. For the conversion of the disazo dyestuffs into trisazo or tetrakisazo dyestuffs there may be used for example diazotized 1 - amino - 3 - benzenesulphonic acid, 1-amino-4-benzenesulphonic acid, nitrated or chlorinated aminobenzenes and their sulphonic acids and also aminonaphthalenes and their sulphonic acids.

The dyestuffs thus obtainable are yellow to red-brown and may be used with advantage for dyeing leather which is thereby dyed in full, powerful shades of good covering power and good properties as regards fastness. The dyestuffs are, however, also suitable for dyeing other fibrous materials, as for example paper or viscose artificial silk.

The process according to this invention differs from that described in the British Patent No. 16,811 A. D. 1901 (in which the coupling only takes place in alkaline solution) in that by reason of the coupling in stages, first in acid solution and only then in alkaline solution, the chlorine atom of the diaminochlorbenzene sulphonic acid is not replaced by a hyroxyl group so that the final dyestuffs still contain chlorine.

The following examples will further illustrate how this invention may be carried out in practice but the invention is not restricted to these examples. The parts are by weight.

Example 1

222.5 parts of 2,6-diamino-1-chlorbenzene-4-sulphonic acid are stirred with 500 parts of concentrated hydrochloric acid and water and tetrazotized with a solution of 138 parts of sodium nitrite in water. A solution of 189 parts of 1,3-diaminobenzene-4-sulphonic acid and 120 parts of caustic soda in water is allowed to flow slowly into the resulting tetrazo solution. The intermediate dyestuff separates from the still acid mixture in the form of a dark red precipitate. This is then stirred into the solution of 114 parts of 1,3-diaminobenzene and 160 parts of anhydrous sodium carbonate in water, whereby a brown solution is formed. When coupling is completed, the whole is rendered acid to congo and the resulting dyestuff is salted out. It dyes leather brown shades which cover well and which are of good fastness.

Example 2

A solution of 110 parts of 1,3-dihydroxybenzene and 40 parts of caustic soda solution in water is added to a tetrazo solution prepared as described in Example 1 and the whole is stirred for an hour. A solution of 110 parts of 1,3-dihydroxybenzene or of 126 parts of 1,3,5-trihydroxybenzene and 120 parts of caustic soda in water is added to the still acid mixture, which thereby becomes alkaline. After coupling is completed, there is stirred into the solution of the disazo dyestuff a diazo solution prepared from 138 parts of 1-amino-4-nitrobenzene which has been neutralized with sodium acetate. A trisazo dyestuff separates and may be used as such; it dyes leather red-brown shades. If the trisazo dyestuff be dissolved in water with the addition of the necessary amount of sodium carbonate and caustic soda solution, and a diazo solution prepared from 195 parts of the sodium salt of 1-amino-4-benzene sulphonic acid be introduced, a tetrakisazo dyestuff is obtained which yields on leather yellow-brown fast dyeings which cover well.

Example 3

An aqueous solution of 106 parts of 1,3-diaminobenzene is slowly added to a tetrazo solution prepared in the manner described in Example 1. After 1 hour an aqueous solution of 115 parts of 5,6-dihydro-1,3-dihydrobenzene and 150 parts of sodium hydroxide is added thereto. In order to complete the coupling process the whole is then stirred for several hours, rendered acid to congo and the dyestuff formed is salted out. It dyes leather and viscose artificial silk powerful dark-brown shades.

In the same manner the following dyestuffs are obtained when coupling tetrazotized 2,6-diamino- 1-chlorbenzene-4-sulphonic acids with the following coupling components:

| 1st coupling component | 2nd coupling component | Shade of color on leather |
|---|---|---|
| 1,3-dihydroxybenzene | 5,6 - dihydro - 1,3 - dihydroxybenzene. | Yellow-brown. |
| Do | 2 - hydroxynaphthalene-6-sulphonic acid | Red-brown. |
| 1,3-diaminobenzene | do | Violet-brown. |
| 1,3-diaminobenzene-4-sulphonic acid. | 2 - hydroxynaphthalene. | Do. |
| 1-nitro-2,4-diaminobenzene. | 1,3 - diaminobenzene-4-sulphonic acid. | Brown-yellow. |

What we claim is:—

1. Polyazo dyestuffs corresponding to the general formula

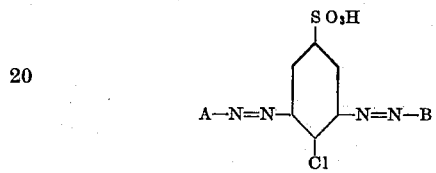

wherein A stands for a radicle of the benzene series capable of being coupled at least twice, and wherein B stands for an aryl radicle capable of being coupled.

2. Polyazo dyestuffs corresponding to the general formula

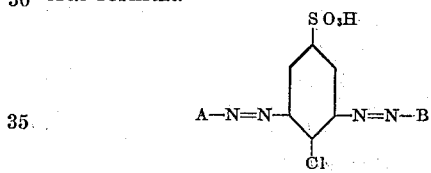

wherein A stands for a radicle of the benzene series capable of being coupled at least twice, wherein B stands for an aryl radicle capable of being coupled and wherein at least one of the radicles A and B contains an azo group.

3. Polyazo dyestuffs corresponding to the general formula

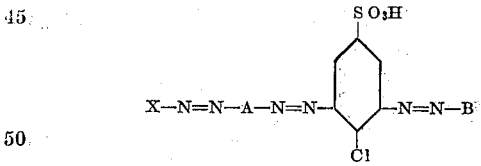

wherein A stands for a radicle of the benzene series capable of being coupled at least twice, and wherein B stands for an aryl radicle capable of being coupled and X stands for an aryl radicle.

4. Polyazo dyestuffs corresponding to the general formula

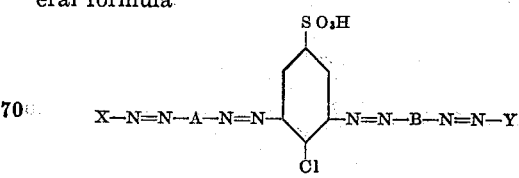

wherein A and B stand for radicles of the benzene series capable of being coupled at least twice, and wherein X and Y stand for aryl radicles.

5. Polyazo dyestuffs corresponding to the general formula

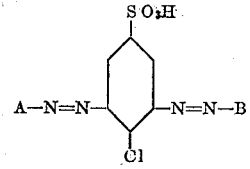

wherein A and B stand for radicles of the benzene series capable of being coupled at least twice.

6. Polyazo dyestuffs corresponding to the general formula

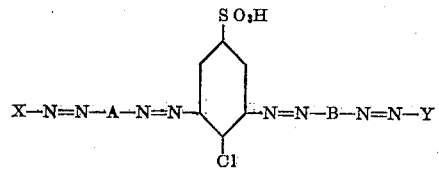

wherein A and B stand for 1,3-dihydroxybenzene radicles capable of being coupled at least twice, and wherein X and Y stand for aryl radicles.

7. The azo dyestuff corresponding to the formula

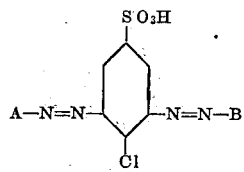

wherein A stands for the radicle of 1,3-diaminobenzene-4-sulphonic acid, and wherein B stands for the radicle of 1,3-diaminobenzene.

8. The azo dyestuff corresponding to the formula

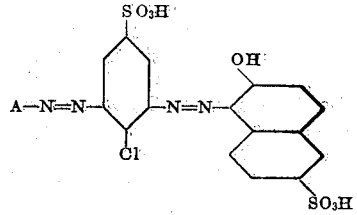

wherein A stands for the radicle of 1,3-dihydroxybenzene.

9. The azo dyestuff corresponding to the formula

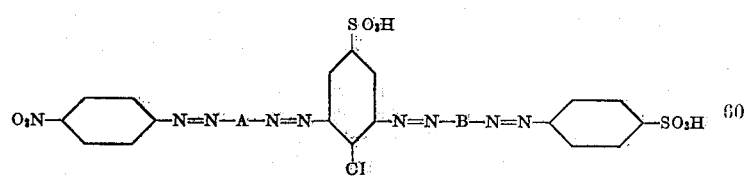

wherein A and B stand for the radicle of 1,3-dihydroxybenzene.

HANS KRZIKALLA.
BERND EISTERT.